UNITED STATES PATENT OFFICE 2,490,567

PREPARATION OF POLYPENTAERYTHRITOLS

Joseph A. Wyler, Allentown, Pa., assignor to Trojan Powder Company, Allentown, Pa., a corporation of New York No Drawing. Application June 10, 1947, Serial No. 753,807

8 Claims. (Cl. 260—615)

The present invention relates to the preparation of polypentaerythritols, and more particularly it relates to a novel and advantageous process by which polypentaerythritols may be prepared by reaction of formaldehyde and acetaldehyde in aqueous solution in the presence of a basic material. This application is filed as a continuation-in-part of copending application Serial No. 543,485, filed July 4, 1944, now abandoned.

In most instances, polypentaerythritols are recovered from impure monopentaerythritol containing very minor proportions (usually less than 4%) of polypentaerythritols, mainly dipentaerythritol. Impure monopentaerythritol is usually obtained by condensing about 4 molecules of formaldehyde with 1 molecule of acetaldehyde in an alkaline medium and at a temperature not exceeding 50° C. and in such a volume of water as to provide a solution containing less than 20% of aldehydes at the beginning of the condensation.

The monopentaerythritol is believed to form in a manner represented by the equation:

$$8CH_2O + 2CH_3CHO + 2ROH = 2C(CH_2OH)_4 + 2ROOCH$$

where R=a monovalent metal as Na, K, etc., or half of a divalent metal as Ca, Ba, Sr, etc.

The dipentaerythritol is believed to form in a manner which may be represented by the equation:

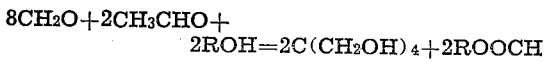

The tripentaerythritol is believed to form in a manner which may be represented by the equation:

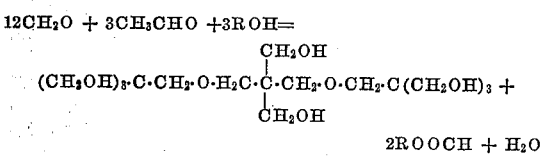

The higher pentaerythritols, particularly the tetra- and the penta-pentaerythritols are also believed to form in an analogous manner.

All these polypentaerythritols are difficultly soluble in cold water, alcohol, and ether, and, with the exception of dipentaerythritol are only slightly more soluble in the hot.

The polypentaerythritols, higher than the dipentaerythritol, are particularly advantageous for use in the preparation of resins, due to the fact that the resins produced therefrom are characterized by more rapid drying, and in improved hardness and enhanced water resistance of the film, as compared to resins produced from monopentaerythritol or dipentaerythritol.

One object of the present invention is to provide a commercially feasible and economical process, involving a minimum number of steps, for the preparation of polypentaerythritols.

Another object of the invention is to provide a process by which the yield of polypentaerythritols produced is high as compared to previous available processes.

A further object of the invention is to provide a process for the preparation of polypentaerythritols in which the desired compounds are caused to precipitate during the reaction between the formaldehyde and the acetaldehyde in the alkaline medium and in which the polypentaerythritols may, therefore, be directly separated from the solution, thus eliminating the necessity of first separating an impure monopentaerythritol by evaporation and crystallization followed by the recovery of the polypentaerythritols by complicated crystallization procedures.

Still another object is to provide a process for the preparation of polypentaerythritols, as the result of which the product obtained contains primarily polypentaerythritols higher than dipentaerythritol.

Other objects will be apparent from a consideration of this specification and the claims.

In accordance with the process of the present invention, the reaction between the formaldehyde and the acetaldehyde in the aqueous alkaline medium is controlled and the various conditions and factors thereof are correlated, in a novel manner, so that as the result of the process a relatively high conversion of the reactants into polypentaerythritols is obtained, and a relatively high yield of a mixture of polypentaerythritols, including pentapentaerythritol, is precipitated in the aqueous medium in which the reaction is conducted. This precipitate contains little, if any, dipentaerythritol. The precipitated material may then be readily separated from the mother liquor.

In the process of the present invention, a relatively concentrated solution of formaldehyde is employed, potassium hydroxide is relied upon to bring about the reaction between the formaldehyde and the acetaldehyde, and the acetaldehyde and the potassium hydroxide solution are each added gradually and substantially concurrently to the formaldehyde solution during at least the major portion of the reaction. The reaction is allowed to proceed until it is substantially complete which may be determined by titrating the reaction medium with iodine solution to determine whether there is any free formaldehyde present; the mixture is stirred to complete the precipitation of polypentaerythritols and to improve the filtering characteristics of the precipitated material; and the precipitated polypentaerythritols are then separated from the mother liquor by filtration, centrifuging, or the like.

Referring to the formaldehyde solution, it has a concentration of at least 27%, preferably above about 30%, formaldehyde by weight at the time of the initial addition of the acetaldehyde thereto. Below about 27%, there is a marked decrease in yield of polypentaerythritols, for example, when a formaldehyde solution, having a concentration of about 20% formaldehyde by weight at the time of the initial addition of the acetaldehyde, is employed, the yield is only about one quarter of that obtained when a 30% formaldehyde solution is employed. The formaldehyde solution may, if desired, be of a higher concentration, for example, up to about 60% by weight. In the preferred embodiment, a formaldehyde solution of between about 40% to 50% by weight, for example, about 45%, is employed, since within this range maximum yields are obtained. In place of formaldehyde, paraformaldehyde or other formaldehyde polymers which in alkaline solution depolymerize to formaldehyde may be employed to provide a formaldehyde solution of at least 27% concentration.

The acetaldehyde is advantageously substantially pure (99% acetaldehyde) and may be substantially anhydrous and supplied in liquid or gaseous form or it may be introduced in the form of a solution, for example, a solution of about 60% strength. The potassium hydroxide is added in the form of a solution and, for convenience, a concentrated solution, for instance a 50% to 60% solution, is usually added although a relatively dilute solution may be employed. The amount of water introduced into the reaction medium with the acetaldehyde and/or the potassium hydroxide is controlled, however, so that the amount will not appreciably exceed that which is present in the system when substantially anhydrous acetaldehyde and a potassium hydroxide solution of about 60% concentration are added to a formaldehyde solution of 27% concentration; that is to say, the amount of water in the system at the completion of the addition of the reactants will not exceed about 60% by weight. When a formaldehyde solution of 45% strength is employed with substantially anhydrous acetaldehyde and a 60% solution of KOH, the amount of water in the system at the completion of the addition of the reactants will be about 45%.

The acetaldehyde is added gradually to the formaldehyde solution and is advantageously added at least at a rate corresponding substantially to that of the rate of reaction between acetaldehyde and formaldehyde in the particular alkaline aqueous medium, but not at a rate sufficient to provide a quantity of free acetaldehyde in the reaction medium at any given time in excess of about 10% of the total acetaldehyde that is to be introduced into the reaction mixture. The amount of free acetaldehyde in the reaction medium can be determined by the prompt titration of a sample of the reaction mixture with an iodine solution. The free acetaldehyde will react with the iodine to form a yellow precipitate of iodoform. In the preferred embodiment, the rate of addition of the acetaldehyde will not be sufficient to provide an appreciable precipitate of iodoform upon titration of a sample of the reaction mixture with iodine solution, showing that the excess of the acetaldehyde present is small; in other words, in the preferred embodiment, the acetaldehyde is added at a rate corresponding substantially to the rate of reaction between acetaldehyde and formaldehyde in the alkaline aqueous medium. The acetaldehyde is added gradually during the reaction, but since the rate of reaction is slower during the addition of the first and last 10% portions, the rates of addition of acetaldehyde during these portions may advantageously be slower than the rate of addition of the intermediate portion of acetaldehyde. As will hereinafter be discussed, the temperature at which the reaction is conducted has a pronounced effect on the rate of addition. The proper rate of addition of the acetaldehyde at any particular point of the process may, however, be determined by the iodine titration test.

The alkali required to provide the alkalinity to the reaction medium and for the reaction is, as stated, provided by potassium hydroxide solution. The relatively high yield of the desired precipitate of polypentaerythritols obtained in the process is dependent on the use of this compound, in connection with the other controlled factors of the process, and cannot be obtained with the use of other alkaline materials such as sodium hydroxide, calcium hydroxide, or barium hydroxide.

Advantageously, a portion of the potassium hydroxide is added to the formaldehyde solution before the acetaldehyde is supplied thereto, for example, it is often times desirable to add about 10% of the total potassium hydroxide to the formaldehyde solution at this time. If desired, however, the potassium hydroxide solution and the acetaldehyde may both be fed at the start into the formaldehyde solution which may or may not have been neutralized in advance.

Except for the small portion of the potassium hydroxide that may be added to the formaldehyde solution in advance of the addition of the acetaldehyde thereto, the potassium hydroxide is added gradually during the course of the reaction at substantially the same time (but separately) that the acetaldehyde is added thereto. The potassium hydroxide is advantageously added at a rate to provide during the major part of the reaction an alkalinity in the reaction medium of between 1% and 7.5%, preferably between 3% and 6% potassium hydroxide by weight as determined by titration with an acid, such as hydrochloric acid. Generally, the alkalinity will be maintained within the limits stated until the reaction is at least about 90% completed. As stated, a small portion of the potassium hydroxide may be added to the formaldehyde solution in advance of the addition of the acetaldehyde thereto, and if such is the case, the alkalinity imparted to the formaldehyde solution does not exceed about 5% and preferably does not exceed about 3%. In the carrying out of the process, the addition of the potassium hydroxide may be completed prior to the completion of the addition of the acetaldehyde. The total amount of potassium hydroxide added during the course of the reaction will be at least in slight excess over that theoretically required for the reaction, for example, about 1.1 mols to about 1.4 mols, and preferably from about 1.25 to about 1.35 mols, of potassium hydroxide for each mol of acetaldehyde added.

The total relative proportions of formaldehyde to acetaldehyde used in the process are within the range of about 3.5 to about 4.5 mols, preferably from 3.8 to 4.2 mols, of formaldehyde to 1 mol of acetaldehyde.

The temperature at which the reaction medium is maintained during the reaction may vary over a range as desired, for example, a temperature as low as about 5° C. to a temperature as high as 55° C. may be employed. In the preferred embodiment, a temperature of about 30° C. to 35° C. is employed. The rate of reaction between the formaldehyde and acetaldehyde is dependent upon the temperature, the rate of reaction increasing with the increase in temperature. For this reason, when relatively high temperatures are employed, the rates of addition of the acetaldehyde (and the potassium hydroxide solution) is correspondingly increased, as determined by the iodine titration test referred to above.

During the addition of the acetaldehyde and the potassium hydroxide solution, it is preferable to agitate the reacting mixture and, after the completion of the addition of the acetaldehyde and the potassium hydroxide solution, the stirring of the mixture is continued to complete the precipitation of the polypentaerythritols and to improve the filtrability of the precipitate. The precipitated polypentaerythritols may then be separated from the solution by any desired means, for example, by filtration, centrifuging, or the like. The filtrate, which is saturated with respect to polypentaerythritols and in addition contains monopentaerythritol, may be treated by known means to obtain the various pentaerythritol materials therefrom.

In order to point out the invention further, the following examples, in which all parts are by weight, are given by way of illustration:

*Example 1*

266 parts, of a 45% solution, by weight, of formaldehyde (119.6 parts $CH_2O$) in water were placed in a suitable vessel provided with mechanical stirring. 12.3 parts of a mixture consisting of 72.8 parts of KOH in 50 parts of water were added to this formaldehyde solution at about 30° C., providing an alkalinity of 2.2% KOH by weight, followed by the addition of 44 parts of acetaldehyde (99+%) over a period of about one hour at a temperature of 30° C.–35° C., during which the remainder of the KOH solution was added over a period of about 45 minutes. The rate of addition of the acetaldehyde was at least equal to the rate of reaction between the formaldehyde and acetaldehyde and such that the acetaldehyde was substantially reacted as it was added thereto as was shown by titration with iodine solution. The rate of addition of the potassium hydroxide solution was such that after about 15 minutes the alkalinity of the solution was about 5.8% potassium hydroxide by weight, and throughout the remainder of the reaction the alkalinity of the reacting medium was maintained between 3.0% and 5.8% potassium hydroxide by weight. The reaction was allowed to proceed to an end point of 0.58% $CH_2O$ as determined by iodine titration, and the mixture was stirred for several days to allow the polypentaerythritols to properly precipitate in filtrable form. The polypentaerythritols were filtered off, washed with water, and dried at 100° C.–110° C. The yield of polypentaerythritols as thus filtered off and dried was 40.3 parts or more than 33% of theory. The filtrate, of course is saturated with polypentaerythritols and also contains monopentaerythritol. These can be recovered by acidifying the filtrate with formic acid, boiling down to small volume, cooling, separating the crystals, washing the latter with water to obtain a mixture of pentaerythritol, dipentaerythritol, tripentaerythritol, etc. which may be separated into its constituents by any known process. The polypentaerythritols thus obtained increase the total yield substantially.

*Example 2*

In this case, all conditions were substantially the same as under Example 1, except that the formaldehyde (119.6 parts) was in the form of a 30% solution instead of the 45% solution used in Example 1. The 12.3 parts of potassium hydroxide solution added to the formaldehyde solution provided an alkalinity of 1.5% potassium hydroxide by weight. About 15 minutes after the beginning of the addition of the acetaldehyde the alkalinity of the reacting medium reached 3.4% potassium hydroxide, and the reacting solution was maintained throughout the remainder of the reaction at an alkalinity of between 3% and 5.9% potassium hydroxide by weight. The yield in this case was about 26% of theory (31.7 grams), not considering the polypentaerythritols which remained in solution after the original filtration.

*Example 3*

The same procedure was followed as in Example 1 except that the formaldehyde (119.6 parts) was in the form of a 60% solution instead of a 45% solution. The 12.3 parts of potassium hydroxide solution added to the formaldehyde solution provided an alkalinity of 2.75% potassium hydroxide by weight. About 15 minutes after the beginning of the addition of the acetaldehyde the alkalinity of the reacting medium reached 7.1% and the reacting medium was maintained throughout the remainder of the reaction, at an alkalinity of between 4.2% and 7.1% potassium hydroxide by weight. The yield in this case was about 32% of theory (39.1 grams), not considering the polypentaerythritols which remained in solution after the original filtration.

Considerable modification is possible in the steps of the process, as well as in the relative amounts of the reactants employed, without departing from the essential features of the invention.

I claim:

1. The process for the preparation of polypentaerythritols which comprises adding acetaldehyde and potassium hydroxide solution gradually and substantially concurrently to a formaldehyde solution containing at least 27% formaldehyde by weight, the amount of water in the system at the completion of the addition of the acetaldehyde and potassium hydroxide solution not exceeding about 60% by weight; reacting the acetaldehyde with the formaldehyde and stirring the reacting mixture until the reaction is substantially complete and polypentaerythritols have precipitated from the aqueous solution; and separating the precipitated polypentaerythritols from the solution.

2. The process of claim 1 wherein the acetaldehyde is substantially anhydrous, wherein the concentration of formaldehyde in the solution at the time of the initial addition of the acetaldehyde is between about 30% and about 60% by weight, and wherein the total ratio of formaldehyde to acetaldehyde in the reaction mixture is within the range of about 3.5 to 4.5 mols of the former to 1 mol of the latter.

3. The process of claim 1 wherein the acetaldehyde is substantially anhydrous, wherein the concentration of the formaldehyde in the solution at the time of the initial addition of the acetaldehyde is between about 40% and about 50% by weight, and wherein the total ratio of formaldehyde to acetaldehyde is between about 3.8 and 4.2 mols of the former to 1 of the latter.

4. The process for the preparation of polypentaerythritols which comprises adding acetaldehyde and potassium hydroxide solution gradually to a formaldehyde solution containing at least 27% formaldehyde by weight and containing less than about 5% potassium hydroxide by weight, the acetaldehyde being added at least at a rate corresponding substantially to that of the rate of reaction between acetaldehyde and formaldehyde in the alkaline aqueous medium but at a rate insufficient to provide a quantity of free acetaldehyde in the reaction medium at any time in excess of about 10% of the total acetaldehyde to be introduced into the reaction mixture, the potassium hydroxide solution being added at a rate to provide during at least the major portion of the reaction an alkalinity in the reaction medium of between about 1% and about 7.5% of potassium hydroxide by weight, and the amount of water in the system at the completion of the addition of the acetaldehyde and potassium hydroxide solution not exceeding about 60% by weight; reacting the acetaldehyde with the formaldehyde and stirring the reacting mixture until the reaction is substantially complete and polypentaerythritols are precipitated from the aqueous solution; and separating the precipitated polypentaerythritols from the solution.

5. The process of claim 4 wherein the acetaldehyde is substantially anhydrous, wherein the concentration of formaldehyde in the solution at the time of the initial addition of the acetaldehyde is at least about 30% by weight, and wherein the total ratio of formaldehyde to acetaldehyde in the reaction mixture is within the range of about 3.5 to 4.5 mols of the former to 1 mol of the latter.

6. The process of claim 4 within the acetaldehyde is substantially anhydrous, wherein the concentration of formaldehyde in the solution at the time of the initial addition of the acetaldehyde is between about 40% and about 50% by weight, and wherein the total ratio of formaldehyde to acetaldehyde is between about 3.8 and about 4.2 mols of the former to 1 mol of the latter.

7. The process of claim 4 wherein the acetaldehyde is substantially anhydrous, wherein the concentration of formaldehyde in the solution at the time of the initial addition of the acetaldehyde is at least about 30% by weight, wherein the acetaldehyde is added at a rate corresponding substantially to the rate of reaction between acetaldehyde and formaldehyde in the alkaline aqueous medium, wherein the potassium hydroxide solution is added at a rate to provide during at least the major portion of the reaction an alkalinity in the reaction medium of between about 3% and about 6% of potassium hydroxide by weight, and within the total ratio of formaldehyde to acetaldehyde in the reaction mixture is within the range of about 3.5 to 4.5 mols of the former to 1 mol of the latter.

8. The process of claim 4 wherein the acetaldehyde is substantially anhydrous, wherein the concentration of formaldehyde in the solution at the time of the initial addition of the acetaldehyde is between about 40% and about 50% by weight, wherein the acetaldehyde is added at a rate corresponding substantially to the rate of reaction between acetaldehyde and formaldehyde in the alkaline aqueous medium, wherein the potassium hydroxide solution is added at a rate to provide during at least the major portion of the reaction an alkalinity of between about 3% and about 6% of potassium hydroxide by weight and wherein the total ratio of formaldehyde to acetaldehyde is between about 3.8 and 4.2 mols of the former to 1 mol of the latter.

JOSEPH A. WYLER.

REFERENCES CITED

The following references are of record in the file of this patent:

UNITED STATES PATENTS

| Number | Name | Date |
|---|---|---|
| 2,325,589 | Bried | Aug. 3, 1943 |
| 2,401,749 | Burghardt et al. | June 11, 1946 |